United States Patent

Samuelson

[15] 3,684,045
[45] Aug. 15, 1972

[54] INTEGRAL DISK BRAKE APPARATUS FOR SNOWMOBILES

[72] Inventor: Donald G. Samuelson, Anoka, Minn.

[73] Assignee: Textron, Inc., Providence, R.I.

[22] Filed: Feb. 12, 1971

[21] Appl. No.: 114,812

[52] U.S. Cl. ............... 180/5 R, 180/1.64, 192/18 A
[51] Int. Cl. ............................................. B62m 27/02
[58] Field of Search ...... 74/230.17 E; 188/72.4, 71.1, 188/18 A; 180/5 R, 70, 66, 9.64; 192/18 A, 85 AA

[56] References Cited

UNITED STATES PATENTS

| 2,260,797 | 10/1941 | Burns | 180/25 R |
| 2,955,682 | 10/1960 | Kelly | 188/18 A X |
| 3,036,681 | 5/1962 | Crosby | 192/85 AA |
| 3,536,153 | 10/1970 | Bombardier | 180/5 R |
| 3,605,511 | 9/1971 | Deschene | 74/230.17 E |
| 2,924,287 | 2/1960 | Bramley | 180/70 R X |
| 3,521,718 | 7/1970 | Masaoka | 180/5 R X |

Primary Examiner—Richard J. Johnson
Attorney—Merchant & Gould

[57] ABSTRACT

A snowmobile is shown having a chain case housing unit mounted between the engine and the drive track. The housing unit carries a driven shaft engaged for common rotation with the drive track. A braking disk is mounted on the shaft. A manually adjustable brake pad is mounted on one side of the disk and a fluid piston operated brake pad is mounted on the other side. Manually operable pump means are mounted on the handlebars to actuate the piston. Major portions of the braking unit are integrally formed with the chain case housing unit.

8 Claims, 4 Drawing Figures

PATENTED AUG 15 1972
3,684,045
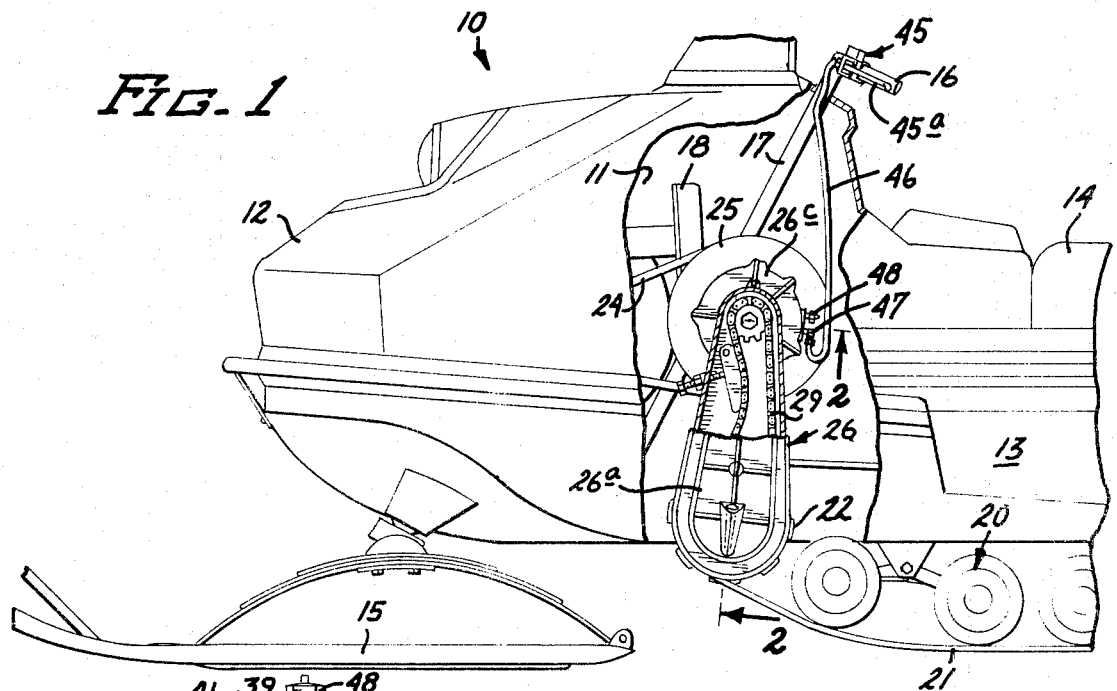
FIG. 1
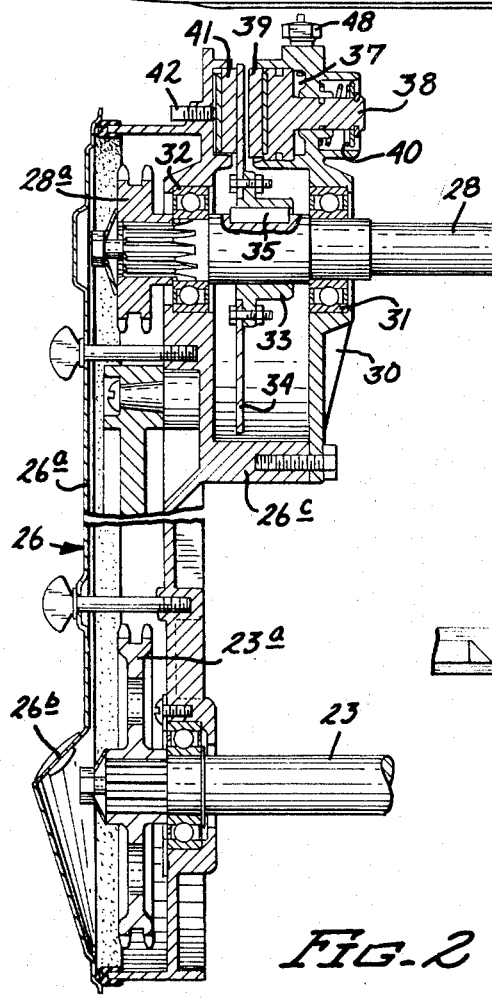
FIG. 2
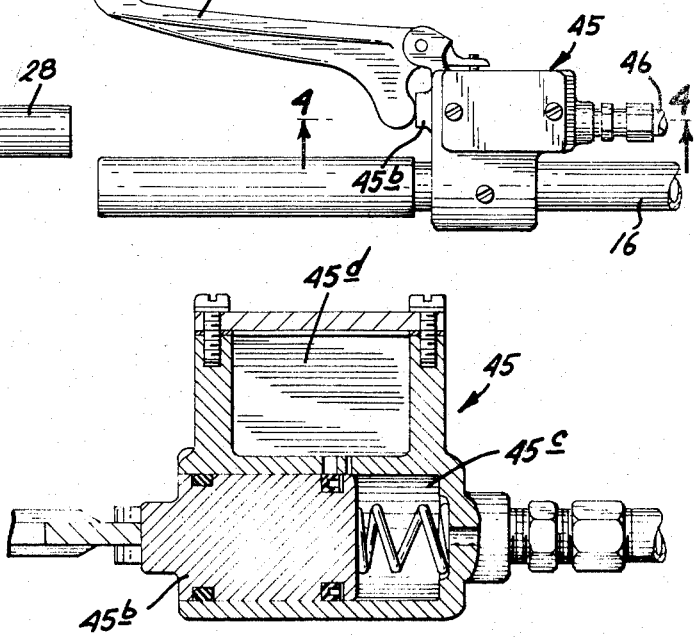
FIG. 3
FIG. 4
INVENTOR.
DONALD G. SAMUELSON
BY
MERCHANT & GOULD
ATTORNEYS

INTEGRAL DISK BRAKE APPARATUS FOR SNOWMOBILES

BACKGROUND OF THE INVENTION

1. Field of the Invention

This invention relates generally to braking systems for snowmobiles and more particularly relates to an improved fluid operated disk brake assembly for snowmobiles in which major portions of the assembly are integrally formed with the chain case housing.

2. Description of the Prior Art

Prior art snowmobiles have used both band-type brakes and disk-type brakes. Typically, the manufacturer of the snowmobile has purchased a complete braking system from an outside supplier and has simply mounted it on the snowmobile. This has added more than necessary expense to the cost of the snowmobile and has required considerable space for mounting purposes. The prior art snowmobile braking systems of which I am aware have also been actuated by means of a metal cable extending from the snowmobile handlebars to the braking system. Many problems have arisen because of the difficulties involved in keeping the cables properly adjusted. Prior art snowmobile braking systems have therefore been costly, difficult to assemble, too cumbersome for the space available and almost impossible to keep in proper adjustment.

SUMMARY OF THE INVENTION

The present invention provides a disk-type braking system for a snowmobile, major portions of which are integrally formed with the chain case housing. The system, being designed especially for snowmobiles, occupies much less space than prior systems and is considerably less expensive to manufacture, because of having parts integrally formed with the chain case housing. Another feature of the present invention is that mechanical cables have been eliminated by virtue of mounting a manually operable fluid pump on the handlebars and connecting it by conduit means to a piston cylinder in the chain case housing. An adjustment screw is also provided on the chain case housing to permit adjustment of the disk brake system to compensate for wear. The present invention thus provides a compact, easy to manufacture disk brake assembly for snowmobiles that is completely fluid operated, requiring no troublesome cable connections.

BRIEF DESCRIPTION OF THE DRAWINGS

FIG. 1 is a view in side elevation of a snowmobile, portions thereof broken away and portions thereof shown in section;

FIG. 2 is a view taken along line 2—2 of FIG. 1, portions thereof broken away;

FIG. 3 is a view in top plan of a portion of FIG. 1; and

FIG. 4 is a view taken along line 4—4 of FIG. 3.

DESCRIPTION OF THE PREFERRED EMBODIMENT

Referring now to the drawings, wherein like reference numerals will be used throughout the several views to identify like elements of the invention, there is disclosed a snowmobile 10 having a unitary body with a forwardly located engine compartment 11 covered by a hood 12, and an inverted, generally U-shaped rear tunnel portion 13. The top of tunnel portion 13 is provided with cushions 14 to provide a seat for the operator. Snowmobile 10 has a pair of front-running skis 15, one of which is shown, to support the front end of the vehicle and to provide means for steering the vehicle. A handlebar unit 16 is mounted in front of the operator position and is connected to the skis 15 by means including a shaft 17. Handlebar unit 16 and shaft 17 are located generally between the engine compartment 11 and the rear seating portion.

An engine 18 is mounted in compartment 11 to provide motive power for the vehicle. Mounted within the inverted, generally U-shaped tunnel portion 13 is a spring-biased, bogie-type suspension system 20 that engages the lower run of an endless drive track 21. The front end of track 21 engages a pair of drive sprocket wheels 22, one of which is shown, mounted on a drive shaft 23 rotatably mounted at its opposite ends in the side walls of tunnel portion 13.

A centrifugal clutch, not shown, is mounted on engine 18 to drivingly engage a V-belt 24 above a certain engine speed. Further transmission means extend between the engine and the drive track including a driven clutch assembly 25 responsive to V-belt 24 and a chain case housing unit 26 extending between driven clutch 25 and drive shaft 23.

Mounted for rotation within the upper end of housing unit 26 is a driven shaft 28, one end of which extends from the housing for connection with the driven clutch 25. The other end of driven shaft 28 terminates within housing unit 26 and is provided with a sprocket wheel 28a having a drive chain 29 mounted thereon for engagement with a sprocket wheel 23a mounted on the end of drive shaft 23. Driven shaft 28 is thus operatively engaged with the drive track 21 for common driving movements thereof.

The inner wall and side walls of housing unit 26 are integrally molded or formed as a single unit and the open outer side wall is provided with a removable cover assembly 26a. Cover assembly 26a is provided with a small opening 26b having a removable plug therein, through which oil can be added to lubricate the drive chain and sprocket wheels.

Formed integrally with the main body portion of housing unit 26 at the upper end thereof is a brake assembly housing 26c surrounding driven shaft 28 and having an open end thereof covered by a plate 30. Plate 30 is bolted around its periphery to the outer edge of brake assembly housing unit 26c as shown in FIG. 2. Driven shaft 28 extends through the middle of plate 30 and is supported therein by a bearing assembly 31. The inner end of shaft 28 is supported in the rear wall portion of housing unit 26c by another bearing assembly 32.

Keyed to driven shaft 28 for rotation therewith, between bearing assemblies 31 and 32 is a hub 33 carrying a circular brake disk 34 having first and second opposed braking surfaces. Hub 33 is keyed on shaft 28 by means of a key 35 permitting limited axial movements of hub 33 with respect to shaft 28.

Integrally formed in the top portion of plate 30 is a piston chamber 37 having a piston 38 mounted therein. A first brake pad 39 is mounted on the end of piston 38 facing one surface of brake disk 34. Piston 38 is movable between disk engaging and disk releasing positions.

In FIG. 2, piston 38 is shown biased to the normal disk releasing position by means of a spring 40 cooperating with piston 38 and plate 30. When brake fluid is forced into piston chamber 37 by means later to be described, piston 38 is forced toward brake disk 34 against the bias of spring 40 to thereby engage brake pad 39 with the adjacent surface of brake disk 34.

A second brake pad 41 is mounted in another chamber integrally formed in housing unit 26c adjacent the other surface of brake disk 34. The chamber is sufficiently deep to permit movements of brake pad 41 toward and away from the brake disk surface. An adjustment screw 42 extends through housing unit 26c so that its inner end is positioned in contact with the second brake pad 41. As the brake pads 39 and 41 become worn through use, brake pad 41 can be moved toward brake disk 34 by means of adjustment screw 42. This permits travel of piston 38 to be constant regardless of wear on the brake pads.

Mounted by means of a suitable clamp or handlebar steering unit 16 is a manually operable pump 45. Pump 45 includes a pivotal handle 45a that operates a small spring-loaded piston 45b to force fluid from a piston chamber 45c (supplied from a fluid supply chamber 45d) out through a conduit 46 that is connected at its other end of a hose connection 47 mounted in plate 30 and leading to chamber 37. Thus, when handle 45a is pivoted toward handle 16 by the operator, piston 45b is moved inwardly to reduce the size of chamber 45c and force brake fluid carried thereby through conduit 46 into piston chamber 37. A bleed driver 48 is mounted in housing unit 26c in fluid communication with chamber 37 to permit air to be bled from the brake fluid chambers and conduit.

Piston 38 is thus forced by the fluid toward brake disk 34 until brake disk 34 is tightly engaged between the two brake pads 39 and 41. As previously mentioned, hub 33 is axially movable with respect to shaft 28 so that it automatically centers the brake disk between the two brake pads.

As shown in FIG. 2, the top edge of housing unit 26c is not completely sealed in the area of brake disk 34 and brake pads 39 and 41, so that air flow is provided to cool the brake assembly.

What is claimed is:

1. In a snowmobile having a unitary body with front running support and steering skis, an endless drive track supporting the rear portion thereof, a forwardly located engine compartment with an engine therein, transmission means extending between said engine and said drive track including a housing unit having a driven shaft therein and means to operatively engage with said drive track for common driving movements thereof, and means for selectively engaging or disengaging said shaft with said engine, the improvement comprising:
    a. disk means within said housing unit having first and second opposed braking surfaces mounted on said shaft for rotation therewith;
    b. first and second brake pads;
    c. mounting means for separately mounting said first and second brake pads within said housing unit adjacent said first and second surfaces, respectively; and
    d. manually operable fluid power means for moving selected ones of said brake pads and disk means to frictionally engage said disk means between said first and second brake pads to brake said drive track, said mounting means and manually operable fluid power means having substantial portions thereof integrally formed as a part of said housing unit.

2. The apparatus of claim 1 wherein said disk means includes a hub portion mounted on said shaft, said hub portion being keyed to said shaft for limited axial movements thereon to automatically center said disk means between said first and second brake pads upon actuation of said manually operable means.

3. The apparatus of claim 2 wherein said mounting means and said manually operable means include a piston having said first brake pad mounted thereon, said piston being mounted in a piston chamber integrally formed in said housing unit for movements between disk engaging and disk releasing positions, spring means to bias said piston to said disk releasing position, manually operable pump means, and conduit means connecting said pump means to said piston chamber, and wherein said pump means, conduit means and piston chamber have a supply of brake fluid therein to move said piston to said disk engaging position in response to manual operation of said pump means.

4. The apparatus of claim 3 wherein said second brake pad is mounted in a second chamber integrally formed in said housing for movements toward and away from said second surface and wherein means are provided to hold said second brake pad in close proximity to said second surface and to permit selective adjustment thereof.

5. The apparatus of claim 4 wherein said last named means is an adjustment screw extending through said housing unit and having an inner end positioned in contact with said second brake pad.

6. A snowmobile having a unitary body with front running skis, an endless drive track supporting a rear seating portion thereof, a forwardly located engine compartment with an engine therein, transmission means extending between said engine and said drive track including a housing unit having therein a driven shaft and means to operatively engage with said drive track for common driving movements thereof, means for selectively engaging or disengaging said shaft with said engine, a braking disk within and substantially enclosed by said housing and mounted on said shaft for rotation therewith, first and second brake pads located on opposite sides of said disk, a piston chamber integrally formed in said housing unit, a piston assembly located in said piston chamber having said first brake pad mounted thereon and being movable between an operative disk engaging position and an inoperative disk releasing position, manually operable pump means, conduit means connecting said pump means to said piston chamber, said pump means, conduit means and piston chamber having a supply of brake fluid therein to move said piston assembly to said disk engaging position in response to manual operation of said pump means, a second chamber in said housing unit, said second brake pad being mounted in said second chamber for movements toward and away from said braking disk, and means to adjustably position said second brake pad in close proximity to said braking disk.

7. The apparatus of claim 6 including handlebar steering means connected to said skis located between said engine compartment and said rear seating portion, and wherein said manually operable pump means is mounted on said handlebar steering means.

8. The apparatus of claim 6 wherein an adjustment screw extends through said housing unit with an inner end thereof positioned in contact with said second brake pad to permit selective adjustment of the position thereof.

* * * * *